Figure 1:
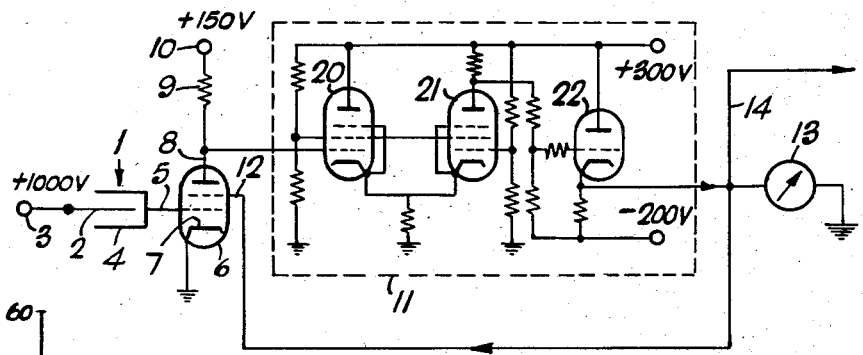

Nov. 4, 1958 — R. J. COX — 2,859,353
CIRCUITS FOR CURRENT MEASUREMENTS
Filed June 16, 1954

United States Patent Office 2,859,353
Patented Nov. 4, 1958

2,859,353
CIRCUITS FOR CURRENT MEASUREMENTS

Raymond John Cox, Wantage, England, assignor, by mesne assignments, to the United States of America as represented by the United States Atomic Energy Commission Application June 16, 1954, Serial No. 437,210

12 Claims. (Cl. 250—83.1)

This invention relates to circuits for the measurement on a logarithmic scale of current flowing in a high impedance. Such circuits have one application in the control of nuclear reactors where the current to be measured is that in an ionisation chamber placed in the reactor to measure neutron density (reactor power). Other applications are in the measurement of insulation resistance and in the measurement of the electrical resistance of timber to derive an indication of its moisture content.

Electrons emitted from a heated cathode into a retarding field, for example towards a negative anode in a vacuum diode, are mostly returned to the cathode but those with adequate energy can reach the negative anode and in doing so they constitute a current. The relationship between voltage of the negative electrode and logarithm of current flowing is linear over a wide range of small currents. When an ionisation chamber in a nuclear reactor is connected together with a positive H. T. source in series with a vacuum diode with an earthed cathode the anode of the diode becomes negative with respect to the cathode and the voltage of the anode provides a measure of the logarithm of the current flowing in the chamber and hence a measure of logarithm of neutron density in the reactor. This simple diode circuit has the disadvantage that variations in the temperature of the cathode of the diode alter the voltage/log. current characteristic and as the temperature of the cathode is difficult to control within close tolerances the circuit has limited use, especially in relation to the control of nuclear reactors.

This disadvantage is overcome, in accordance with the invention, by a circuit incorporating a vacuum valve having three or more electrodes wherein the control grid and cathode function as the anode and cathode respectively of a diode, there being included in the circuit of the valve means for maintaining the current nearly constant through the valve; that is, providing that the valve operates with a constant amplification factor then the relationship between plate voltage (in the case of a triode) or screen voltage (in the case of the pentode) and logarithm of grid current is a straight line over a useful working range.

Hence the invention resides in a circuit providing an output quantity logarithmically related to a current flowing in a high impedance and comprising a vacuum valve having an anode, a control grid and a cathode, a connection from the high impedance to the control electrode so that the current flowing through the impedance flows also through the grid/cathode space of the vacuum tube, means tending to stabilise the anode current through the valve with variation of current flowing to the grid and means for measuring the slight deviations of the anode voltage.

The invention also resides in a circuit, suitable for giving a logarithmic indication of current flowing in a high impedance comprising a pentode or tetrode valve, an input connection to the grid thereof so that the current flowing in the high impedance is arranged to pass also through the grid/cathode space of the valve, a D. C. amplifier without phase inversion having its input connected with the anode of the valve and its output connected with the screen grid of the valve whereby the current through the valve is maintained constant with variations of grid current apart from slight deviations controlling the D. C. amplifier and means for measuring the potential at a point in the loop including the D. C. amplifier.

Figure 2:
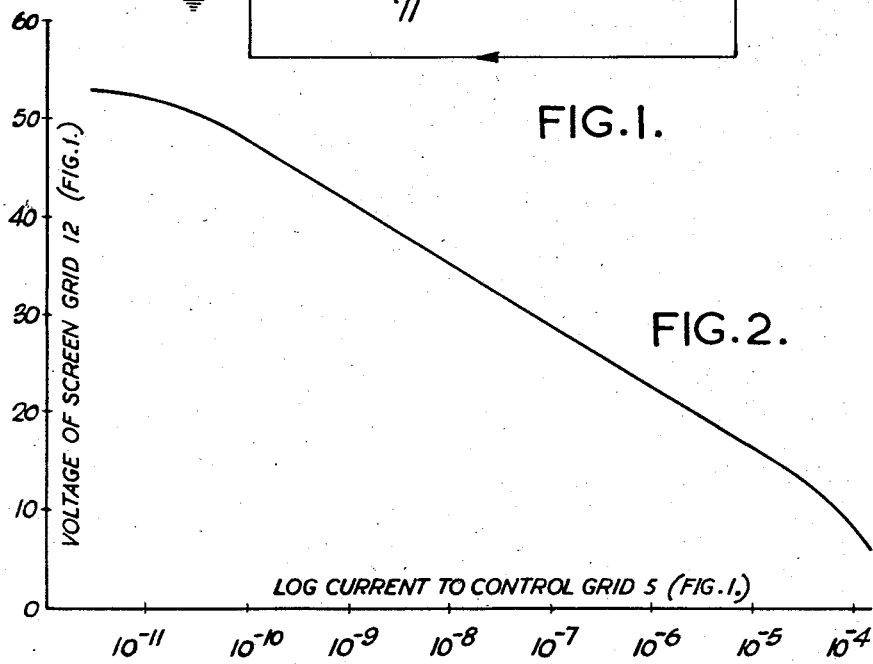
Figure 3:
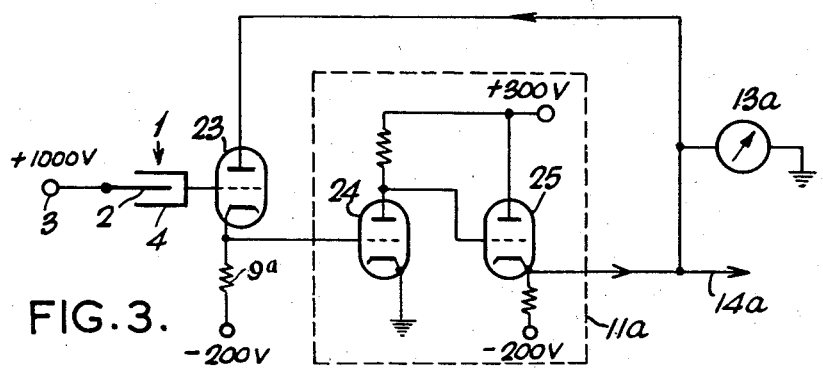

A schematic circuit arrangement suitable for controlling a nuclear reactor is now described with reference to Fig. 1 of the drawing. Fig. 2 shows a graphical current and voltage relationship for the valve 6 of Fig. 1. Fig. 3 is a modified circuit arrangement.

A neutron sensitive ionisation chamber 1 constituting the high impedance has its centre electrode 2 connected to a high tension terminal 3 at 1000 volts. A connection is made between the outer electrode 4 and the grid 5 of a tetrode electrometer valve 6 having its cathode 7 earthed and its anode 8 connected via a load resistance 9 to a terminal 10 at 150 volts. Between the anode 8 and the screen 12 there is connected a D. C. amplifier 11 providing an output without phase inversion. A voltmeter 13 measures the voltage of the screen 12 at the output of the amplifier 11. This meter is calibrated with a logarithmic scale in units of "Reactor Power." The potential at the screen 12 may also be fed to automatic control means over a connection 14.

As the reactor power increases (i. e. as ionising events in the chamber 1 increase) the current through the chamber 1 increases. This current is drawn through the control grid/cathode space of the valve 6 and hence the voltage of the control grid becomes less negative and the voltage of the anode falls which acts through the amplifier 11 to decrease the screen grid voltage (Fig. 2) which tends to stabilise the anode current.

In one particular embodiment of the above described circuit the valve 6 is a ME. 1400 type as manufactured by the Mullard Radio Valve Co. Ltd. and the anode load 9 consists of a 1 megohm resistor, thus giving an anode current of about 130 microamps for the anode supply voltage shown in the drawings. The D. C. amplifier is of a conventional type comprising two pentodes 20 and 21 connected as a "long tailed pair" and a triode 22 connected as a cathode follower giving an overall gain of about 50 and the meter 13 is such as to provide a full scale reading at 1 ma.

In adapting the circuit of the invention for use with a triode valve 23 as shown in Fig. 3, the load resistance 9a is placed in the cathode circuit and D. C. amplification with phase inversion provided from the cathode to the anode by means of a D. C. amplifier 11a comprising a triode 24 directly coupled to another triode 25 arranged as a cathode follower, the meter 13a being connected to indicate the anode voltage which is also the D. C. output of the amplifier. A connection 14a may also be taken to automatic control means.

It will be understood that when the invention is used to measure the value of the impedance the meter is calibrated in terms of resistance for a given high tension source 3.

I claim:
1. A circuit arrangement for the measurement on a logarithmic scale of current flowing in a high impedance comprising a thermionic valve having at least a cathode, a control grid and an anode, a high potential source, means for connecting the high impedance between the said source and the control grid whereby the current to be measured flows through the grid/cathode space of the valve, a feed-back loop between the anode and one other electrode tending to stabilise the anode current and means dependent on the voltage in said loop for indicating the value of the grid current.

2. A circuit arrangement as claimed in claim 1 wherein said valve is a pentode valve and the feed-back loop comprises a D. C. amplifier without phase inversion having its input connected to the anode and its output connected to the screen grid of the valve.

3. A circuit arrangement as claimed in claim 2 wherein the means dependent on the voltage in said loop for indicating the value of the grid current comprises a meter connected to the output of the amplifier.

4. A circuit arrangement for the control of a nuclear reactor comprising a thermionic valve having at least a cathode, a control grid and an anode, a neutron sensitive ionisation chamber, a connection between one terminal of said chamber and the grid of the valve whereby the ionisation chamber current flows through the grid/cathode space of the valve, a feed-back loop between the anode and one other electrode tending to stabilise the anode current of the valve and an output connection from said loop for delivering a control potential.

5. A circuit arrangement as claimed in claim 4 wherein said valve is a pentode valve and the feed-back loop comprises a D. C. amplifier without phase inversion having its input connected to the anode and its output connected to the screen grid of the valve.

6. A circuit arrangement as claimed in claim 5 comprising a connection from the output of the amplifier for feeding a control potential to the reactor.

7. A circuit arrangement providing an output quantity logarithmically related to an input current comprising a vacuum valve having an anode, a control grid and a cathode, an input connection whereby a current may be fed to said control grid and caused to flow through the grid-cathode space of the valve, a feedback loop tending to stabilize the current through the valve and means dependent on the voltage in said loop for indicating the value of the input current.

8. A circuit arrangement as claimed in claim 7 wherein the valve is a pentode having a screen grid, and the feedback loop comprises a D. C. amplifier having its input connected to the anode and its output to the screen grid of the valve.

9. A circuit arrangement as claimed in claim 7 wherein the valve is a triode and the feedback loop comprises a D. C. amplifier having its input connected to cathode and its output to the anode of the valve.

10. A circuit arrangement as claimed in claim 7 wherein the means dependent on the voltage in said loop comprises a meter connnected to the output of the amplifier.

11. A circuit arrangement as claimed in claim 8 wherein the means dependent on the voltage in said loop comprises a meter connected to the output of the amplifier.

12. A circuit arrangement as claimed in claim 9 wherein the means dependent on the voltage in said loop comprises a meter connected to the output of the amplifier.

References Cited in the file of this patent

UNITED STATES PATENTS

| | | |
|---|---|---|
| 2,086,965 | Shepard | July 13, 1937 |
| 2,122,222 | Vingerhoets | June 28, 1938 |
| 2,360,523 | Simmons | Oct. 17, 1944 |
| 2,510,691 | Gilbert | June 6, 1950 |
| 2,648,015 | Greenfield et al. | Aug. 4, 1953 |
| 2,651,726 | Froman et al. | Sept. 8, 1953 |
| 2,728,862 | De Bourgknecht | Dec. 27, 1955 |
| 2,736,817 | Bell | Feb. 28, 1956 |